United States Patent
Youssef et al.

(10) Patent No.: US 9,671,502 B2
(45) Date of Patent: Jun. 6, 2017

(54) ADAPTIVE SYNTHETIC POSITIONING

(71) Applicant: Samsung Electronics Co., Ltd., Gyeonggi-do (KR)

(72) Inventors: Mohamed Youssef, Marion, IA (US); Andi Jakupi, Marion, IA (US); Bruce McCullough, Robins, IA (US); William Stewart, Palo Alto, CA (US)

(73) Assignee: Samsung Electronics Co., Ltd (KR)

( * ) Notice: Subject to any disclaimer, the term of this patent is extended or adjusted under 35 U.S.C. 154(b) by 116 days.

(21) Appl. No.: 14/819,823

(22) Filed: Aug. 6, 2015

(65) Prior Publication Data

US 2016/0195621 A1 Jul. 7, 2016

Related U.S. Application Data

(60) Provisional application No. 62/099,362, filed on Jan. 2, 2015.

(51) Int. Cl.

| | |
|---|---|
| *G01C 21/00* | (2006.01) |
| *G01S 19/48* | (2010.01) |
| *G06F 17/30* | (2006.01) |
| *G01C 21/28* | (2006.01) |
| *G01S 19/50* | (2010.01) |

(52) U.S. Cl.
CPC ............ *G01S 19/48* (2013.01); *G01C 21/28* (2013.01); *G01S 19/50* (2013.01); *G06F 17/30241* (2013.01)

(58) Field of Classification Search
CPC ................. G01S 19/48; G01C 21/28
See application file for complete search history.

(56) References Cited

U.S. PATENT DOCUMENTS

| | | | |
|---|---|---|---|
| 6,084,547 A | 7/2000 | Sanderford et al. | |
| 6,597,906 B1 * | 7/2003 | Van Leeuwen | H04W 4/02 455/422.1 |
| 7,076,365 B2 | 7/2006 | Tzamaloukas | |
| 7,990,314 B2 | 8/2011 | Liao | |
| 2005/0273254 A1 * | 12/2005 | Malchi | G01C 21/005 702/152 |

(Continued)

FOREIGN PATENT DOCUMENTS

WO    WO 2013171465    11/2013

*Primary Examiner* — Adam Alharbi
(74) *Attorney, Agent, or Firm* — The Farrell Law Firm, P.C.

(57) ABSTRACT

Methods, systems, and portable devices capable of adaptive synthetic positioning while in a dead zone are described. In one method, when a portable device having a Global Navigational Satellite System (GNSS) receiver and a dead zone database enters a dead zone, it determines whether the dead zone database has a record for the dead zone. If it does, it retrieves parameters corresponding to the dead zone from the database and calculates synthetic position solutions using the retrieved parameters while in the dead zone. The portable device may also use the synthetic position solutions to help calculate position solutions when exiting the dead zone. If a dead zone database record does not exist, the portable device determines parameters for calculating synthetic position solutions in the dead zone and a new dead zone database record indicating a set of parameters based on the determined set of parameters is created.

11 Claims, 3 Drawing Sheets

(56) References Cited

U.S. PATENT DOCUMENTS

| | | | |
|---|---|---|---|
| 2007/0010965 A1* | 1/2007 | Malchi | G01C 3/06 702/151 |
| 2008/0082254 A1 | 4/2008 | Huhtala et al. | |
| 2013/0018578 A1 | 1/2013 | Matsuo et al. | |
| 2013/0331131 A1 | 12/2013 | Fix et al. | |
| 2014/0080502 A1 | 3/2014 | Chiang et al. | |

* cited by examiner

ADAPTIVE SYNTHETIC POSITIONING

PRIORITY

The present application claims priority under 35 U.S.C. §119(e) to U.S. Provisional Application No. 62/099,362, entitled "Adaptive Synthetic Positioning," which was filed on Jan. 2, 2015, the contents of which are incorporated herein by reference.

BACKGROUND

Field of the Disclosure

The present disclosure relates generally to providing adaptive synthetic positioning when a portable device with a Global Navigational Satellite System (GNSS) receiver is in a blocked area and, more specifically, to calculating and storing parameters in a portable device which can be used to model the travel path through a blocked area (such as, e.g., a tunnel) and improve position solutions when exiting the blocked area.

Description of the Related Art

Satellite navigational systems provide positional and sometimes time information to earth-bound receivers. Each system has its own constellation of satellites, sometimes referred to as satellite/space vehicles (SVs), orbiting the Earth, and in order to calculate its position a receiver in that system on Earth uses the satellites "in view" (i.e., in the sky above) of that system's constellation. Generally, the larger the number of satellites in view, the more accurate the calculation of the receiver's position is likely to be. Global Navigational Satellite Systems (GNSS) is often used as the generic term for such systems, even though such navigational satellite systems include regional and augmented systems—i.e., systems that are not truly "global."

As the electronics for GNSS receivers have gotten smaller, and the positional calculations have become more accurate, the use of GNSS functions has become ubiquitous in consumer and other electronic devices, from cellular telephones to automobiles. As the number of uses for GNSS receivers has grown substantially and is still growing, the number of GNSS systems, both planned and presently operational, is also growing. The widely-known, widely-used, and truly global Global Positioning System (GPS) has been joined by one other global system, the GLObalnaya NAvigatsionnaya Sputnikovaya Sistema (GLONASS), and is currently being joined by the Galileo and BeiDou systems—each of which has, or will have, its own constellation of satellites orbiting the globe. The rise in truly global GNSSs is resulting in a new generation of "multi-constellation" GNSS receivers which receive signals from more than one satellite constellation (e.g., two or more of GPS, Galileo, GLONASS, and/or BeiDou) and can provide much greater accuracy because the number of unblocked satellites overhead at any time from several constellations is always greater than the number of SVs overhead from a single constellation. The term "GNSS receiver" as used herein is not limited to any particular kind or type of GNSS receiver, and of course includes multi-constellation receivers, single constellation receivers, augmented system receivers, receivers with multiple positioning systems, etc.

Regional satellite navigational systems (those that are not global, but intended to cover only a certain region of the globe) include the Quasi-Zenith Satellite System (QZSS) and the Indian Regional Navigational Satellite System (IRNSS) currently being developed. Augmented systems (which are normally regional as well, and which "augment" with, e.g., messages from ground-based stations and/or additional navigational aids) include Wide Area Augmentation System (WAAS), European Geostationary Navigation Overlay Service (EGNOS), Multi-functional Satellite Augmentation System (MSAS), and GPS Aided Geo Augmented Navigation (GAGAN). The term "GNSS," as used herein, covers any type of navigational satellite system, whether global, regional, augmented, or otherwise, unless expressly indicated otherwise.

Broadly speaking, the reception/processing of GNSS signals involves three phases: acquisition, tracking, and positional calculation (producing a "navigation solution" or "position solution"). Acquisition is the acquiring or identifying of the current satellites in view (SVs), which means satellites that are "visible" overhead, i.e., the satellites from which the GNSS receiver can receive signals. Obviously, in any truly "global" GNSS constellation of satellites, only some of the satellites are orbiting overhead at any time. Acquisition might use one or more of satellite almanac and/or ephemeris information, the GNSS receiver's last positional calculation, assistive information concerning the local region received by terrestrial transmission, signal processing (specifically, finding satellite signals by correlating known signal patterns, such as pseudorandom sequences), and other means well-known by those of ordinary skill in the art, in order to acquire the current SVs. Acquisition can be understood as "finding" the SVs, and tracking as the fine tuning of the signals received from the acquired SVs and keeping track of the acquired SVs over time. Once acquired and adequately tracked, the SV's signals are processed to extract the navigational, positional, timing, and other data transmitted in each SV's signal, and the data from all the SV's being tracked is then used to calculate the GNSS receiver's position. Of course, there are further complexities to the actual reception and processing of GNSS signals, such as various loops feeding back information between these phases for further correction and adjustment of data, as is known to one of ordinary skill in the art.

However, there are times when all of the satellites overhead are completely blocked and/or their signals fail to reach the GNSS receiver, such as when travelling through a tunnel. Various solutions have been proposed for operating a GNSS receiver while in a blocked area, also referred to as being "offline" or in a "dead zone".

Accordingly, there is a need for methods, systems, and portable devices capable of adaptive synthetic positioning while in a dead zone, with a minimum drain on available resources (both hardware and software) and less required complex calculations/interactions.

SUMMARY

Accordingly, the present disclosure has been made to address at least the problems and/or disadvantages described above and to provide at least the advantages described below. In one aspect of the present disclosure, methods, systems, and portable devices capable of adaptive synthetic positioning are provided. In another aspect of the present disclosure, methods, systems, and portable devices capable of adaptive synthetic positioning while in a dead zone, with a minimum drain on available resources (both hardware and software), are provided. In yet another aspect of the present disclosure, methods, systems, and portable devices capable of adaptive synthetic positioning while in a dead zone, which require less complex calculations/interactions, are provided.

In accordance with one aspect of the present disclosure, a method for a portable device having a Global Navigational Satellite System (GNSS) receiver is provided, including when a dead zone is entered, determining whether a dead zone database has a record for the dead zone; if a dead zone database record exists for the dead zone: retrieving polynomial coefficients corresponding to the dead zone from the dead zone database; calculating one or more synthetic position solutions using the polynomial coefficients while in the dead zone; and using at least one of the one or more synthetic position solutions to calculate one or more position solutions when exiting the dead zone, wherein a dead zone comprises an area where either no or insufficient GNSS satellite signals are received by the portable device.

In accordance with another aspect of the present disclosure, a portable device is provided, including a receiver that receives Global Navigational Satellite System (GNSS) signals; one or more non-transitory computer-readable media, wherein at least one of the one or more non-transitory computer-readable media stores a set of instructions; and one or more processors, wherein at least one of the one or more processors, when executing the set of instructions stored in the at least one of the one or more non-transitory computer-readable media, controls the portable device to perform at least the following steps: when a dead zone is entered, determining whether a dead zone database has a record for the dead zone; if a dead zone database record exists for the dead zone: retrieving polynomial coefficients corresponding to the dead zone from the dead zone database; calculating one or more synthetic position solutions using the polynomial coefficients while in the dead zone; and using at least one of the one or more synthetic position solutions to calculate one or more position solutions when exiting the dead zone, wherein a dead zone comprises an area where either no or insufficient GNSS satellite signals are received by the portable device.

In accordance with yet another aspect of the present disclosure, a method for a portable device having a Global Navigational Satellite System (GNSS) receiver is provided, including when a dead zone is entered, retrieving parameters corresponding to the dead zone; calculating one or more synthetic position solutions using the retrieved parameters; and using at least one of the one or more synthetic position solutions to calculate one or more position solutions after exiting the dead zone.

BRIEF DESCRIPTION OF THE DRAWINGS

The above and other aspects, features, and advantages of embodiments of the present disclosure will be more apparent from the following detailed description taken in conjunction with the accompanying drawings, in which.

DETAILED DESCRIPTION

Figure 1:
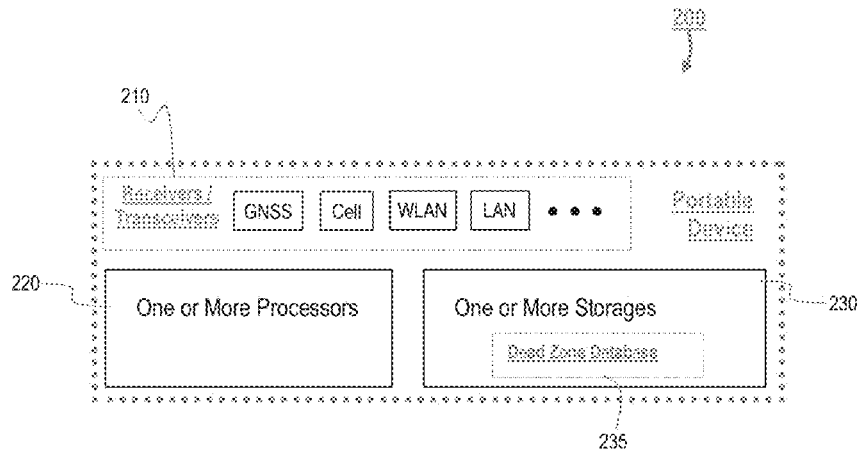
FIG. 1 is a diagram of a portable device 200 according to an embodiment of the present disclosure.

Various embodiments of the present disclosure will now be described in detail with reference to the accompanying drawings. In the following description, specific details such as detailed configuration and components are merely provided to assist the overall understanding of these embodiments. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Various embodiments may comprise one or more elements. An element may comprise any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in this specification are not necessarily all referring to the same embodiment.

Systems, devices, and methods according to embodiments of the present disclosure provide adaptive synthetic positioning for a portable device having a GNSS receiver when in, or coming out of, a dead zone. The positioning is necessarily synthetic (i.e., synthesized), as the estimated position solution cannot use live, real time GNSS signals. In some embodiments, the travelling path through (and out of) the dead zone will be indicated by the coefficients of a fitted polynomial equation, where those coefficients are used by the portable device to generate synthetic position fixes while in the dead zone. In some embodiments, the known exit from the dead zone will be geo-fenced (discussed more fully further below) in order to guarantee more accurate position fixes. Depending on the embodiment, some or all of the coefficients may be pre-set/stored in the portable device, calculated by the portable device, and/or downloaded/updated from another source. In some embodiments, dead zones are mapped so that the portable device will know that it is about to enter a dead zone. In some embodiments, the portable device itself identifies dead zones and stores information concerning them (such as, e.g., parameters which indicate the travelling path through the dead zone). In other embodiments, outside sources provide dead zone location information to the portable device and/or signal the portable device that a dead zone is being entered and/or exited.

Embodiments described herein use, for example, the coefficients ($a_3$, $a_2$, $a_1$, $a_0$) of a cubic polynomial ($f(x,t)=a_3t^3+a_2t^2+a^1t+a_0$) to indicate/describe a travelling path in a dead zone because the curves on highways can be modeled with a cubic polynomial. Starting with railroads, civil engineers became aware that certain curvatures, such as those constructed using the "cubic parabola", caused less "jerk" on the passengers. See, e.g., THE RAILWAY TRANSITION SPIRAL by Arthur N. Talbot, Eng. News. Publishing Co., New York (1901), which is hereby incorporated by reference in its entirety. Although more complicated and precise methods were subsequently developed, the cubic polynomial is still an effective model for the curves on highways (and railroads). In one embodiment discussed below, two sets of coefficients are used, one for latitude ($f(x,t)=a_3t^3+a_2t^2+a^1t+a_0$), the other for longitude ($f(y,t)=b_3t^3+b_2t^2+b^1t+b_0$). However, embodiments of the present disclosure are not limited to coefficients of the cubic polynomial. Coefficients for another type of equation type or, more generally, any other parameters which can serve to identify a path or trajectory could be used. Moreover, different parameters and/or combinations of parameters could be used.

FIG. 1 is a diagram of a portable device 200 according to an embodiment of the present disclosure. Portable device 200 could be a mobile terminal, a camera, a multimedia player, a notepad computer, a laptop computer, a portable navigational tool, a navigational tool which can be removably plugged into or otherwise integrated into a type of moving vehicle, such as, for example, an automobile, etc. Portable device 200 has a plurality of receivers and transceivers 210, including a GNSS receiver, a mobile/cellular telecommunications system transceiver (Cell), and a Wireless Local Area Network (WLAN) transceiver, such as an IEEE 802.11 or Bluetooth transceiver, and wired Local Area Network (LAN) functionality, such as, for example, IEEE 802.3 (Ethernet). These receivers/transceivers 110 may have separate and/or shared components, such as antennae and reception chains. The three solid dots in the receiver/transceiver 210 box indicate here, and elsewhere in this application, that more receivers/transceivers may exist in portable device 200. In other embodiments, the portable device may have only GNSS receiver.

Portable device 200 also has one or more processors 220. As is well-known to one of ordinary skill in the art, the number of processors would depend on the specific portable device being implemented. For example, a mobile terminal may have less, and more- or less-specialized, processors than a laptop computer, and thus some of the functions described herein in relation to one or more processors 220 may be further distributed among various processors in a laptop computer than in a mobile terminal. As another example, depending on the embodiment, components such as receivers/transceivers 210 may have independent hardware controllers (which constitute processors) which perform functions for direct control of one or more components, while one or more separate processors perform most of the analysis and processing discussed herein in reference to embodiments of the present disclosure.

Portable device 200 also has one or more storages 230, at least one of which is capable of storing non-transitory computer-readable data and instructions which can be accessed and executed by at least one of the one or more processors 220. As would be understood by one of ordinary skill in the art, one or more storages 230 may comprise volatile and/or non-volatile media, typically currently implemented with memory circuits.

Dead Zone Database 235 is stored in the one or more storages 230. Dead Zone Database 235 stores the parameters which define/indicate a travelling path through a dead zone. In some embodiments, the parameter sets are indexed according to each particular dead zone. In some embodiments, the parameter sets have an arbitrary indexing, and each dead zone has the index identifier for its particular parameters. By these means, memory space is saved when two or more dead zones share the same set of parameters. One or more client programs/routines executed on one or more processors 220 use the parameters in Dead Zone Database 235 to generate synthetic position fixes while in the dead zone. In some embodiments, Dead Zone Database 235 also stores location information concerning one or more dead zones, which information is used to identify when portable device 200 is entering a dead zone and possibly where portable device 200 will exit the dead zone.

In some embodiments, Dead Zone Database 235 also stores geofencing information concerning the exit of one or more dead zones. In the most general terms, a "geofence" is a virtual perimeter of a real world geographic area. In this context, the geofence would be a virtual perimeter around the exit from the dead zone, where the GNSS solutions generated upon leaving the dead zone would be limited to within the virtual perimeter. Geofencing information could also be stored concerning the boundaries of the dead zone. As mentioned above, this and all other data stored in the Dead Zone Database 235 may be any of pre-set/stored, determined by the portable device, and/or downloaded/updated from an external source.

In some embodiments, the dead zone database is not stored on the portable device, but rather is accessed by the portable device over the transceivers/receivers 210. In other embodiments, the dead zone database operates as a distributed memory, where all or part of the dead zone database is stored in various locations which are accessible by various means. For example, a portion of the database may be on the portable device and other portions accessible over a local or wide-area network, such as the Internet.

Figure 2A:
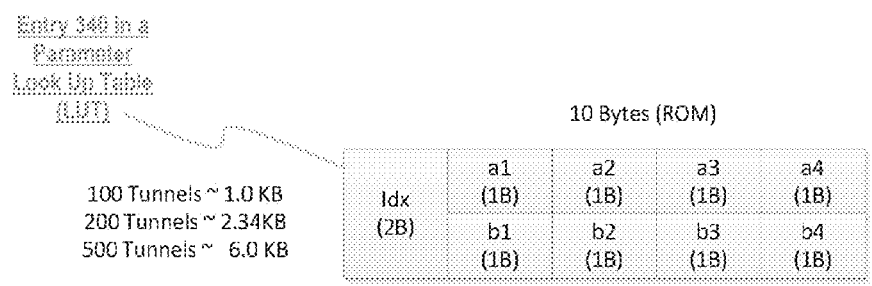
FIGS. 2A and 2B show entries/records in an embodiment of Dead Zone Database 235 from FIG. 1.
Figure 2B:
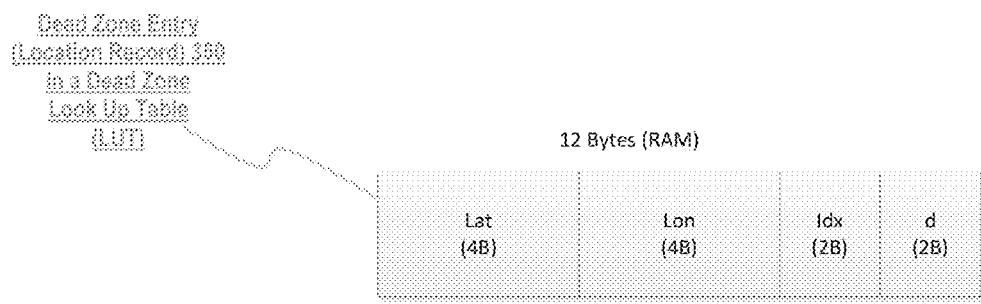

FIGS. 2A and 2B show entries/records in an embodiment of Dead Zone Database 235 from FIG. 1. Parameter Look Up Table (LUT) Entry 340 shown in FIG. 2A comprises an index identifier (Idx) and two sets of parameters, which, in this embodiment, comprises the cubic polynomial coefficients for latitude ($a_1, a_2, a_3, a_4$) and longitude ($b_1, b_2, b_3, b_4$) used to generate the synthetic positions. In some embodiments, there may be two small geofences at each side of the tunnel, each of which is treated separately. In other embodiments, each entrance to a dead zone would have its own location record. Given one byte for each coefficient and two bytes for the index identifier, one entry only comprises 10 bytes. Thus, entries for 100 dead zone parameter sets would be roughly 1 KB, 200 dead zones would be roughly 2.34 KB, and 500 dead zones would only be roughly 6 KB—a minimal use of memory.

Dead Zone LUT Entry 350 (also referred to herein as a location record) shown in FIG. 2B comprises a latitude (Lat, 4 bytes), a longitude (Lon, 4 bytes), an index identifier (Idx, 2 bytes), and a distance (d, 2 bytes) of the travel path through the dead zone (such as a tunnel). In some embodiments, each entrance to a dead zone would have its own location record and corresponding set of polynomial coefficients. In some embodiments, differences/offsets are stored in the location record rather than the coordinates themselves.

Thus, the embodiment of Dead Zone Database 235 shown in FIGS. 2A and 2B comprises two LUTs: a Dead Zone LUT which has entries such as 350, and a Coefficient LUT, which has polynomial coefficients indexed by identifiers. This embodiment uses a minimum of resources for implementation, but is only one of many possible embodiments. One of ordinary skill in the art would recognize the large variety of possible implementations of a dead zone database and also which types of implementations would be better depending on the type and use of the portable device involved.

Figure 3:
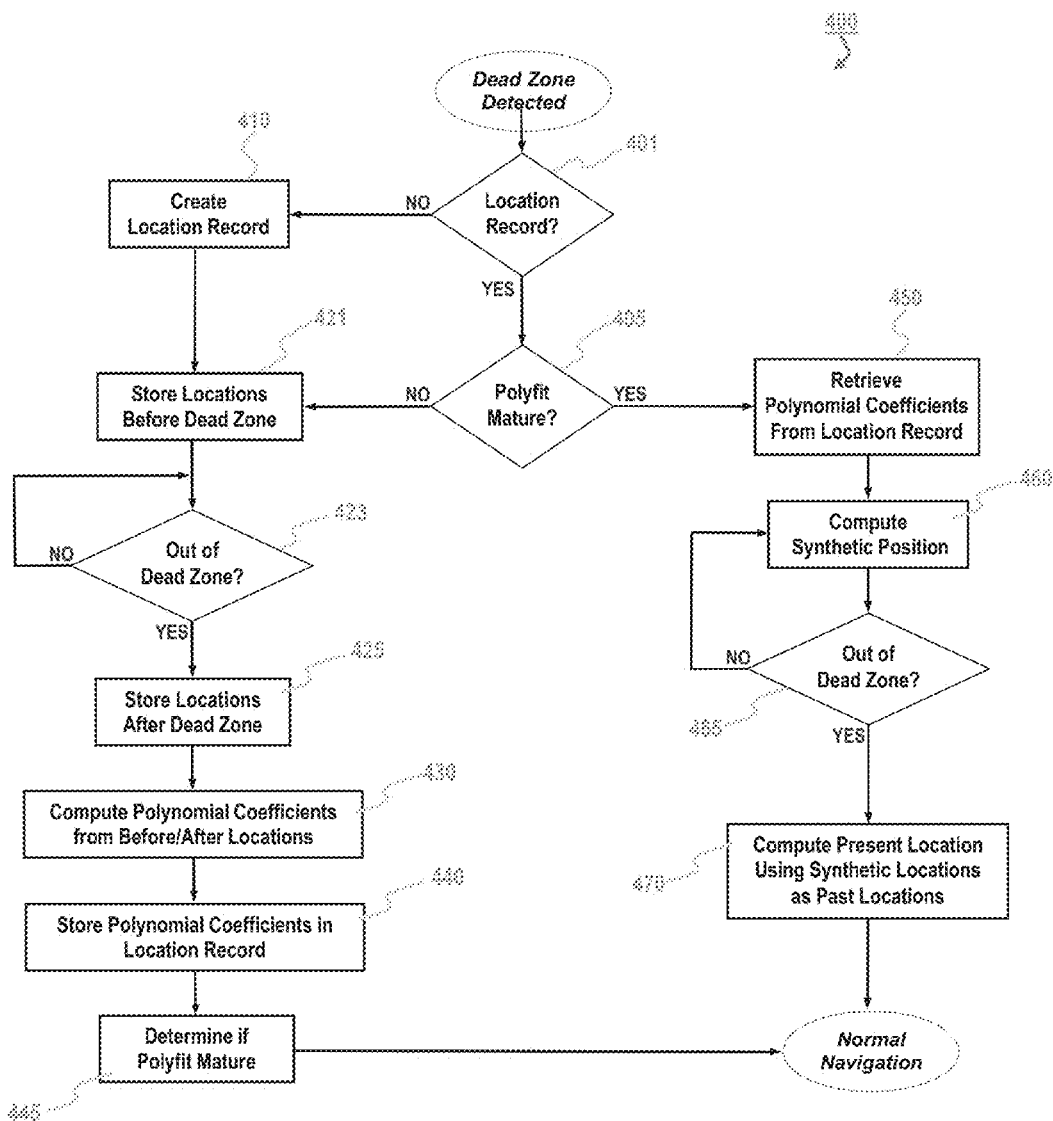
FIG. 3 is a flowchart of a method according to an embodiment of the present disclosure.

FIG. 3 is a flowchart of a method according to an embodiment of the present disclosure. The method in FIG. 3 is completely self-contained, i.e., the portable device generates the polynomial coefficients itself, maintains the Dead Zone Database itself, etc. This is, of course, one extreme and, as mentioned above and below, other embodiments may have more or less information/data provided by sources external to the portable device.

The method assumes that the GNSS function is presently activated, and starts with a Dead Zone being detected. In the large variety of possible implementations of the detection function, some actions taken by the detection function may overlap with the steps in the method. For example, the location record itself may be used to identify the entrance into its dead zone. The portable device may have more than one way to detect a dead zone. In the simplest self-contained example, a dead zone may be detected when no satellites are detectable while the portable device is moving at more than 15 miles per hour, or a threshold time for non-reception is reached. One of ordinary skill in the art would recognize the large variety of possible means to detect and/or identify a dead zone.

In step 401, it is determined whether the Dead Zone LUT in FIG. 2B has a location record for the current position. If not, a location record, such as Dead Zone entry 350 in FIG. 2B, is created for the current location, i.e., the entrance to the dead zone, in step 410. In other embodiments, locations other than the entrance may be used as the "defining" location for the dead zone. If there is a location record in step 401, it is next determined in step 405 whether the polyfit of the stored polynomial coefficients stored in the entry in the Parameter LUT in FIG. 2A corresponding to the dead zone is mature, i.e., that the confidence level for the accuracy of the polynomial fit is adequate. In some embodiments (like this one, see step 445), the maturity of the polyfit is determined as part of the location record creation/updating process, and thus the determining step 405 may be as simple as checking a bit flag set when the coefficients were last stored. One of ordinary skill in the art would recognize the large variety of possible ways to determine the probable accuracy of the calculated polynomial fit and also which types of functions would be better depending on the type and use of the portable device involved.

After a new location record is created in step 410, or after it is determined that the polyfit is not mature in step 405, the position solutions (or locations) calculated before entering the dead zone are temporarily stored in step 421. In step 423, it is determined whether the portable device has exited the dead zone. One of ordinary skill in the art would recognize the large variety of possible ways to determine this. In one embodiment, a minimum number of consecutive fixes is used to determine where the portable device has exited the dead zone. Such an embodiment is also helpful when there are two or more dead zones in a row (e.g., a tunnel through a mountain exiting 100 feet before the entrance to a tunnel through another mountain) and it may be more convenient to consider the two or more closely-located dead zones as one larger dead zone. However, those consecutive fixes, even when less than the minimum, can also be used as extra points for generating the fitted polynomial.

Once the portable device has exited the dead zone (YES in step 423), the position solutions (or locations) calculated using the GNSS receiver are also stored in step 425. The number of position solutions before the entrance and the number of position solutions after the exit that are stored may vary, and one of ordinary skill in the art would recognize the appropriate number may depend on the available memory, the environment, the type, and the purpose/use of the portable device involved. In step 430, the before-and-after locations stored in steps 421 and 425 are used to compute the polynomial coefficients for a polynomial equation which fits the path through the dead zone. This computation could be performed in a number of ways, as would be understood by one of ordinary skill in the art. After calculation, the stored before-and-after locations may be flushed from memory, thereby further reducing resource usage.

In some embodiments, the locations before entering the dead zone are used immediately to calculate the polynomial coefficients in order to generate synthetic locations while in the dead zone and to correct position solutions when exiting the dead zone.

After the parameters, in this case, the polynomial coefficients, are calculated in step 430, they are stored in step 440 in a location record corresponding to the current dead zone. For example, in one embodiment, an entry is created for the current dead zone in the Parameter LUT in FIG. 2A and the calculated polynomial coefficients are stored there. The index identifier Idx of that new Parameter LUT entry is stored as the corresponding Idx in a new entry in the Dead Zone LUT for the current dead zone. In some embodiments, when the location record exists but the polynomial fit is not mature, the polynomial coefficients calculated in step 430 and the previous polynomial coefficients stored in the location record are averaged, and the resulting averaged polynomial coefficients are stored.

The embodiment using the Parameter LUT of FIG. 2A and the Dead Zone LUT of FIG. 2B as the Dead Zone Database is focused on minimizing resources. In order to further limit resource usage, the Parameter LUT could only contain preset polynomial coefficient sets, e.g., the sets most commonly occurring in practice. In such an embodiment, the coefficients calculated in step 430 would not be stored, but rather the index identifier of the preset coefficient set in Parameter LUT matching the calculated set would be stored in the Dead Zone LUT entry.

In other embodiments for which resource usage minimization is not an implementation focus, the Dead Zone Database could save more information about each dead zone. For example, multiple sets of calculated polynomial coefficients could be stored for a new dead zone record in order to obtain the best fit, or geofencing parameters limiting the possible synthetic position solutions in the dead zone and/or the possible calculated positions solutions exiting the dead zone could be stored, or a "score" for the accuracy of the presently stored polynomial coefficient set could be stored so that a set with a better score could replace it if one is found, etc. In other embodiments, both the entrance and exit positions (longitude and latitude) of a single travel path through a dead zone are saved in a single record, and/or such information is stored as part of a separate mapping functionality used by the portable device, i.e., the mapping functionality has information sufficient to identify dead zones, and that information is accessed by the present adaptive synthetic positioning functionality instead of keeping that information in its own records.

In step 445, it is determined whether the set of polynomial coefficients is mature and, in this embodiment, the result is stored in, for example, the dead zone location record. This stored result may be referred to in a later iteration of the method steps, to determine whether the polyfit is mature in step 405. After step 445, the portable device returns to normal navigation, as indicated by the oval.

In some embodiments, where the location record exists in step 401, but the polyfit is not mature in step 405, the portable device still computes synthetic locations using the currently-stored polynomial coefficients, like in steps 450-460-465-470, while also performing steps 421-423-425-430-435.

If it is determined that the polyfit is mature in step 405, the polynomial coefficients are retrieved in step 450. In an embodiment using the Parameter LUT of FIG. 2A and the Dead Zone LUT of FIG. 2B as the Dead Zone Database, the index identifier Idx in the Dead Zone LUT entry for the current dead zone would be used to locate and retrieve the set of polynomial coefficients stored by that index identifier Idx in the Parameter LUT. Synthetic positions are continually generated until the portable device is out of the dead zone, as indicated by the loop of steps 460 and 465. The determination that the portable device is out of the dead zone could be made using the distance d in the location record for the present dead zone, and/or the re-acquisition/tracking of overhead satellites, and/or by other means well-known to those of ordinary skill in the art.

In this embodiment, once out of the dead zone (YES in step 465), the synthetic locations previously calculated are used to improve the initial position solutions determined at the exit from the dead zone in step 470. As mentioned above, the initial position solutions upon exiting, e.g., a tunnel, are normally fairly inaccurate, as the GNSS has to re-acquire the satellite signals after all tracking has been lost. However, in embodiments of the present disclosure, the synthetic position solutions are used to improve those initial position solutions by, for example, using the synthetic positions as feedback when generating the initial position solutions, using the synthetic position solutions to limit the possible area for an "accurate" initial position solution (in some embodiments, this may be done by geofencing), and/or other uses of the synthetic positions to improve the accuracy of the initial positions solutions as would be understood by one of ordinary skill in the art.

After step 470 or step 445, the portable device returns to normal navigation, which depends on the specific implementation of portable device and GNSS receiver.

FIG. 3 is only one embodiment and the present disclosure is not limited thereto. For example, the embodiment in FIG. 3 is self-contained, but, in other embodiments, data/information may be provided by external sources. Starting with the detection of the dead zone, the portable device may be informed it is approaching a dead zone by a local wireless transmitter, by other portable devices in the area, by a server over a wireless transceiver (for example, if the portable device has a cellular telephone transceiver through which it can connect to the server on that or another network), by other sensors in the portable device (which would still be self-contained), etc. In one embodiment, a single simple signal might switch the portable device into dead zone mode without any "detecting" per se. In other embodiments, a server may receive sets of polynomial coefficients for a dead zone from a plurality of portable devices and select the best fit, which selection may then be transmitted back to the portable devices. In some embodiments, portable devices may share and exchange dead zone information when in proximity with each other, such as through WiFi, Bluetooth, and/or Near Field Communication (NFC). In some embodiments, the portable device may download information and/or updates when connected to a network, such as the Internet through a Wireless Local Area Network (WLAN) and/or through a (temporary) wired connection to a desktop or laptop computer.

Figure 4:
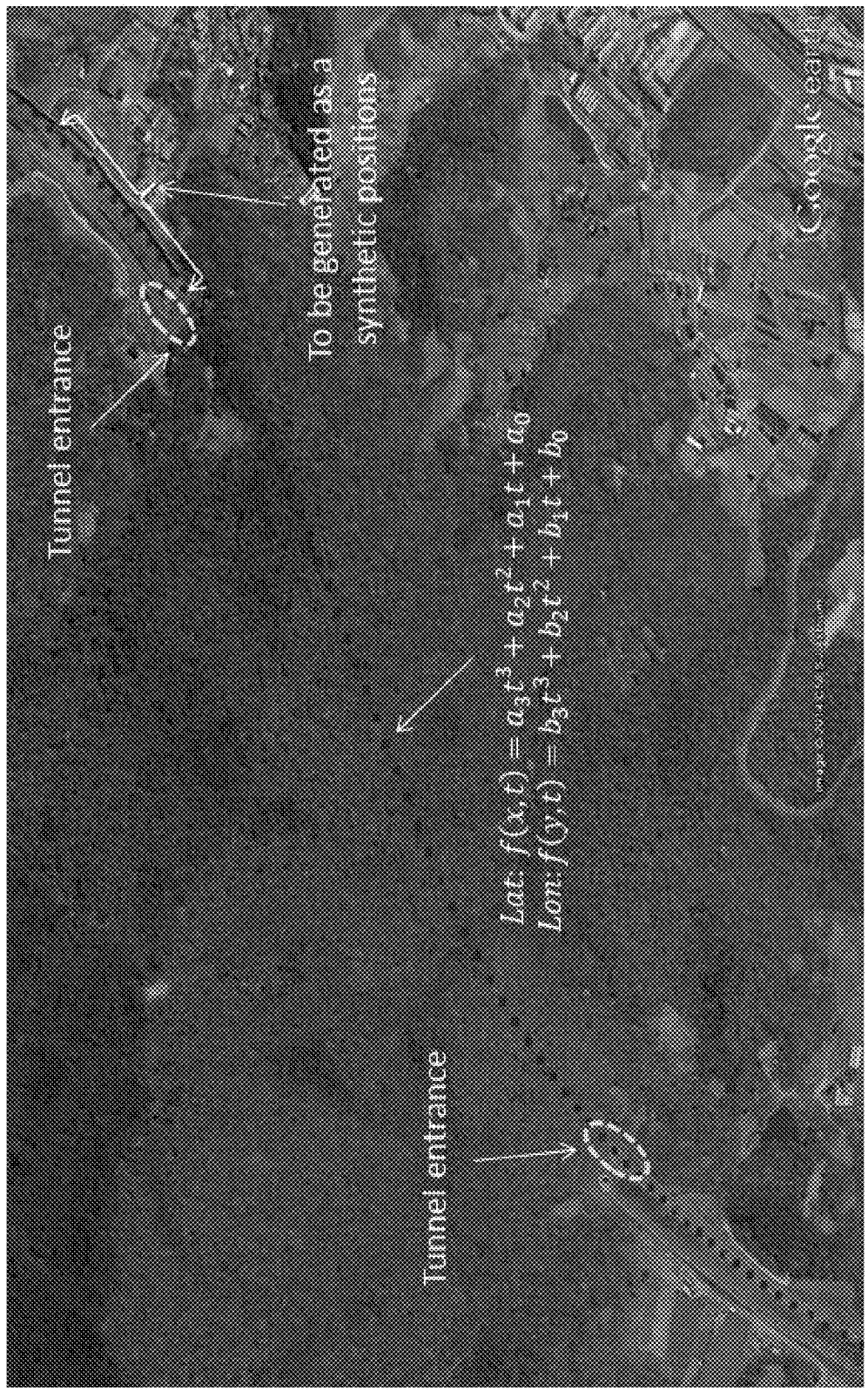
FIG. 4 is a satellite photo of a region in which a simulation of an embodiment of the present disclosure was performed.

FIG. 4 is a satellite photo of a region in which a test of an embodiment using real data was performed. The two circles indicating the two entrances to the dead zone (in this instance, an underwater tunnel) and a dotted line indicating the travel path as estimated by fitting position solutions to a cubic polynomial. More of the details regarding that test and its results are disclosed in the provisional application from which this application claims priority, namely, U.S. Prov. App. No. 62/099,362, entitled "Adaptive Synthetic Positioning," which was filed on Jan. 2, 2015 and the contents of which have already been incorporated herein by reference.

Depending on the embodiment, steps and/or operations in accordance with the present disclosure may occur in a different order, or in parallel, or concurrently for different epochs, etc., in different embodiments, as would be understood by one of ordinary skill in the art. Similarly, as would be understood by one of ordinary skill in the art, FIG. 3 is a simplified representation of the actions performed in one embodiment, and real-world implementations may perform the actions without making "decisions" as are indicated in steps 401, 405, 423, and 465. Similarly, as a simplified representation, FIG. 3 does not show other required steps/operations as these are known and understood by one of ordinary skill in the art and not pertinent and/or helpful to the present description.

Depending on the embodiment, some or all of the steps and/or operations may be implemented or otherwise performed, at least in part, on a portable device. "Portable device" as used herein refers to any portable, mobile, or movable electronic device having the capability of receiving wireless signals, including, but not limited to, multimedia players, communication devices, computing devices, navigating devices, etc. Thus, mobile devices include (but are not limited to) laptops, tablet computers, Portable Digital Assistants (PDAs), mp3 players, handheld PCs, Instant Messaging Devices (IMD), cellular telephones, Global Navigational Satellite System (GNSS) navigation devices, watches, or any such device which can be worn and/or carried on one's person.

Depending on the embodiment, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof. Moreover, the functionality of any "module" discussed herein may be implemented in software, firmware, hardware, and/or any combination thereof.

The one or more non-transitory computer-readable media and/or means for implementing/performing one or more operations/steps/modules of embodiments of the present disclosure may include, without limitation, application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced in any computer system configuration.

Thus, the term "non-transitory computer-readable medium" as used herein refers to any medium that comprises the actual performance of an operation (such as hardware circuits), that comprises programs and/or higher-level instructions to be provided to one or more processors for performance/implementation (such as instructions stored in a non-transitory memory), and/or that comprises machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read, or any other non-transitory medium from which a computer instruction can be read.

While several embodiments of the present disclosure have been shown and described herein, it will be understood by those of ordinary skill in the art that various changes in form and details may be made therein without departing from the spirit and scope of the present disclosure—i.e., the invention is not limited to any embodiments described herein, but is defined by the appended claims and their equivalents.

What is claimed is:

1. A portable device, comprising:
    a receiver that receives Global Navigational Satellite System (GNSS) signals;
    one or more non-transitory computer-readable media, wherein at least one of the one or more non-transitory computer-readable media stores a set of instructions; and
    one or more processors, wherein at least one of the one or more processors, when executing the set of instructions stored in the at least one of the one or more non-transitory computer-readable media, controls the portable device to perform at least the following steps:
        when a dead zone is entered, determining whether a dead zone database has a record for the dead zone;
        if a dead zone database record exists for the dead zone:
            retrieving polynomial coefficients corresponding to the dead zone from the dead zone database;
            calculating one or more synthetic position solutions using the polynomial coefficients while in the dead zone; and
            using at least one of the one or more synthetic position solutions to calculate one or more position solutions when exiting the dead zone,
    wherein the dead zone comprises an area where either no or insufficient GNSS satellite signals are received by the portable device.

2. The portable device of claim 1, wherein at least one of the one or more non-transitory computer-readable media stores at least a portion of the dead zone database and at least one of the one or more processors, when executing the set of instructions stored in the at least one of the one or more non-transitory computer-readable media, controls the portable device to maintain the at least a portion of the dead zone database.

3. The portable device of claim 2, wherein the at least a portion of the dead zone database comprises a polynomial coefficient look up table (LUT) and a dead zone LUT.

4. The portable device of claim 3, wherein an entry in the polynomial coefficient LUT comprises an index identifier and at least one set of polynomial coefficients.

5. The portable device of claim 3, wherein an entry in the dead zone LUT comprises a location of the dead zone and an index identifier corresponding to an entry in the polynomial coefficient LUT having at least one set of polynomial coefficients corresponding to the dead zone.

6. The portable device of claim 1, wherein at least one of the one or more processors, when executing the set of instructions stored in the at least one of the one or more non-transitory computer-readable media, controls the portable device, if a dead zone database record does not exist for the dead zone, to perform:
    calculating polynomial coefficients for a polynomial equation fitting a travel path through the dead zone using at least one of (i) one or more position solutions calculated using GNSS signals before entering the dead zone, and (ii) one or more position solutions calculated using GNSS signals after exiting the dead zone.

7. The portable device of claim 1, wherein at least one of the one or more processors, when executing the set of instructions stored in the at least one of the one or more non-transitory computer-readable media, controls the portable device, if a dead zone database record exists for the dead zone, to perform:
    determining whether the polynomial coefficients in the dead zone database record have reached a threshold level of accuracy.

8. A method for a portable device having a Global Navigational Satellite System (GNSS) receiver, comprising:
    when a dead zone is entered, attempting to retrieve parameters corresponding to the dead zone;
    if parameters are retrieved corresponding to the dead zone:
        calculating one or more synthetic position solutions using the retrieved parameters; and
        using at least one of the one or more synthetic position solutions to calculate one or more position solutions after exiting the dead zone; and
    if no parameters can be retrieved corresponding to the dead zone:
        determining a set of parameters for calculating synthetic position solutions while in the dead zone; and
        storing the set of parameters corresponding to the dead zone.

9. The method of claim 8, wherein the parameters are retrieved from at least one of a server over a wireless communication link and storage in or directly connected to the portable device.

10. The method of claim 8, wherein the parameters are at least one of polynomial coefficients and geofencing coordinates.

11. The method of claim 8, further comprising, if parameters are retrieved corresponding to the dead zone:
    storing new parameters corresponding to the dead zone, where the new parameters are generated from the retrieved parameters and parameters based on the current calculations.

* * * * *